(12) United States Patent
Hosoi

(10) Patent No.: US 7,053,959 B2
(45) Date of Patent: May 30, 2006

(54) DIGITAL VIDEO ENCODER

(75) Inventor: Naoki Hosoi, Tokyo (JP)

(73) Assignee: Sony Corporation (JP)

( * ) Notice: Subject to any disclaimer, the term of this patent is extended or adjusted under 35 U.S.C. 154(b) by 571 days.

(21) Appl. No.: 10/406,290

(22) Filed: Apr. 4, 2003

(65) Prior Publication Data

US 2004/0027491 A1 Feb. 12, 2004

(30) Foreign Application Priority Data

Apr. 10, 2002 (JP) .......................... P2002-107256

(51) Int. Cl.
- *H04N 7/12* (2006.01)
- *H04N 9/67* (2006.01)
- *H04N 11/04* (2006.01)
- *H04N 11/12* (2006.01)

(52) U.S. Cl. ...................... 348/661; 348/495; 348/497; 348/510; 348/511; 348/516; 348/533; 348/544; 348/642; 375/240.28

(58) Field of Classification Search ................ 348/661, 348/497, 495, 516, 523, 533, 521, 522, 510, 348/511, 540, 544, 642, 682; 375/240.28; 341/151; H04N 7/12, 11/04, 11/12, 9/67
See application file for complete search history.

(56) References Cited

U.S. PATENT DOCUMENTS

| 5,019,906 | A | * | 5/1991 | Wesolowski | 348/497 |
|---|---|---|---|---|---|
| 5,596,372 | A | * | 1/1997 | Berman et al. | 348/537 |
| 5,608,462 | A | * | 3/1997 | Maas et al. | 348/531 |
| 5,621,475 | A | * | 4/1997 | Irie | 348/607 |
| 5,760,844 | A | * | 6/1998 | Jorden | 348/691 |
| 5,844,622 | A | * | 12/1998 | Hulvey | 348/546 |
| 5,926,602 | A | * | 7/1999 | Okura | 386/13 |
| 5,963,183 | A | * | 10/1999 | Takahashi | 715/717 |
| 6,038,276 | A | | 3/2000 | Dinh | |
| 6,097,440 | A | * | 8/2000 | Omori et al. | 348/542 |
| 6,177,922 | B1 | * | 1/2001 | Schiefer et al. | 345/698 |
| 6,219,106 | B1 | * | 4/2001 | Sato | 348/525 |
| 6,266,097 | B1 | * | 7/2001 | Jiang et al. | 348/511 |
| 6,297,850 | B1 | * | 10/2001 | Han et al. | 348/521 |
| 6,323,910 | B1 | * | 11/2001 | Clark, III | 348/537 |

(Continued)

FOREIGN PATENT DOCUMENTS

EP 0 375 904 A2 7/1990

(Continued)

OTHER PUBLICATIONS

European Search Report dated Dec. 17, 2004.

*Primary Examiner*—Brian P. Yenke
(74) *Attorney, Agent, or Firm*—Rader, Fishman & Grauer PLLC; Ronald P. Kananen

(57) ABSTRACT

A mask circuit masks a digital video signal so that a video signal of an analog video signal is not outputted for a predetermined period after the start of output of a horizontal synchronizing signal of the analog video signal. A period of masking the digital video signal by the mask circuit is set in a control register, and the control register transmits the masking period to the mask circuit. A digital video signal to analog video signal converting unit converts the digital video signal masked and outputted from the mask circuit into an analog video signal. Thus, by setting in the control register the period of masking the digital video signal until the video signal of the analog video signal is stabilized, a digital video encoder can output a stable video signal.

2 Claims, 5 Drawing Sheets

U.S. PATENT DOCUMENTS

| | | | |
|---|---|---|---|
| 6,329,981 B1 * | 12/2001 | Lin et al. | 345/204 |
| 6,606,127 B1 * | 8/2003 | Fang et al. | 348/500 |
| 6,741,291 B1 * | 5/2004 | Tsubaki | 348/533 |
| 6,778,170 B1 * | 8/2004 | Shu et al. | 345/213 |
| RE38,618 E * | 10/2004 | West | 348/537 |
| 6,831,634 B1 * | 12/2004 | Shigeta | 345/213 |
| 2002/0105592 A1 * | 8/2002 | Felts et al. | 348/554 |

FOREIGN PATENT DOCUMENTS

| | | |
|---|---|---|
| JP | 58-047386 | 3/1983 |
| JP | 2-295226 | 12/1990 |

* cited by examiner

DIGITAL VIDEO ENCODER

BACKGROUND OF THE INVENTION

The present invention relates to a digital video encoder for use in a digital video apparatus and, particularly to a digital video encoder for converting a digital video signal into an analog video signal and outputting the analog video signal.

With digitization of video signals now proceeding, a digital video apparatus for displaying video on a DVD (Digital Versatile Disc), for example, includes a digital video encoder for converting a digital video signal into an analog video signal.

The analog video signal outputted from the digital video encoder comprises a horizontal synchronizing signal, a color burst, and a video signal. FIG. 5 is a diagram showing a waveform of an analog video signal outputted from a conventional digital video encoder. As shown in FIG. 5, the analog video signal comprises a horizontal synchronizing signal, a color burst, and a video signal with a pedestal level as a reference. Incidentally, a certain period from a start point of the horizontal synchronizing signal, which period is defined by analog video signal standards, is referred to as a horizontal blanking period.

The conventional digital video encoder determines the period from the start point of the horizontal synchronizing signal to a start point of the video signal by the following two methods. One method is to output the analog video signal while maintaining a relation between a horizontal synchronizing signal and a video signal of an input digital video signal as it is. The other method is to mask the video signal of the analog video signal during the horizontal blanking period.

However, with the method that maintains the relation between the horizontal synchronizing signal and the video signal of the input digital video signal as it is, when the horizontal synchronizing signal and the video signal of the input digital video signal overlap each other, the video signal is outputted in a state of overlapping both the horizontal synchronizing signal and the color burst of the analog video signal.

With the method of masking the video signal during the horizontal blanking period, in the case where to clamp the pedestal level of the analog video signal is time-consuming, the video signal of the analog video signal is outputted before the pedestal level is stabilized.

Thus, the conventional digital video encoder has a problem in that the video signal of the analog video signal may not be outputted stably.

SUMMARY OF THE INVENTION

The present invention has been made in view of the above, and it is accordingly an object of the present invention to provide a digital video encoder that outputs the video signal of the analog video signal stably.

According to the present invention, there is provided a digital video encoder for converting a digital video signal into an analog video signal and outputting the analog video signal, including: a mask circuit for masking the digital video signal inputted thereto to prevent the video signal from being outputted for a predetermined period from the start of output of a horizontal synchronizing signal of the analog video signal; and a control register having the predetermined period set therein for transmitting the set predetermined period to the mask circuit.

With the above configuration, by setting in the control register the period of masking the digital video signal until the video signal is stabilized, the video signal of the analog video signal is outputted.

DETAILED DESCRIPTION OF THE PREFERRED EMBODIMENT

A preferred embodiment of the present invention will hereinafter be described with reference to the drawings.

Figure 1:
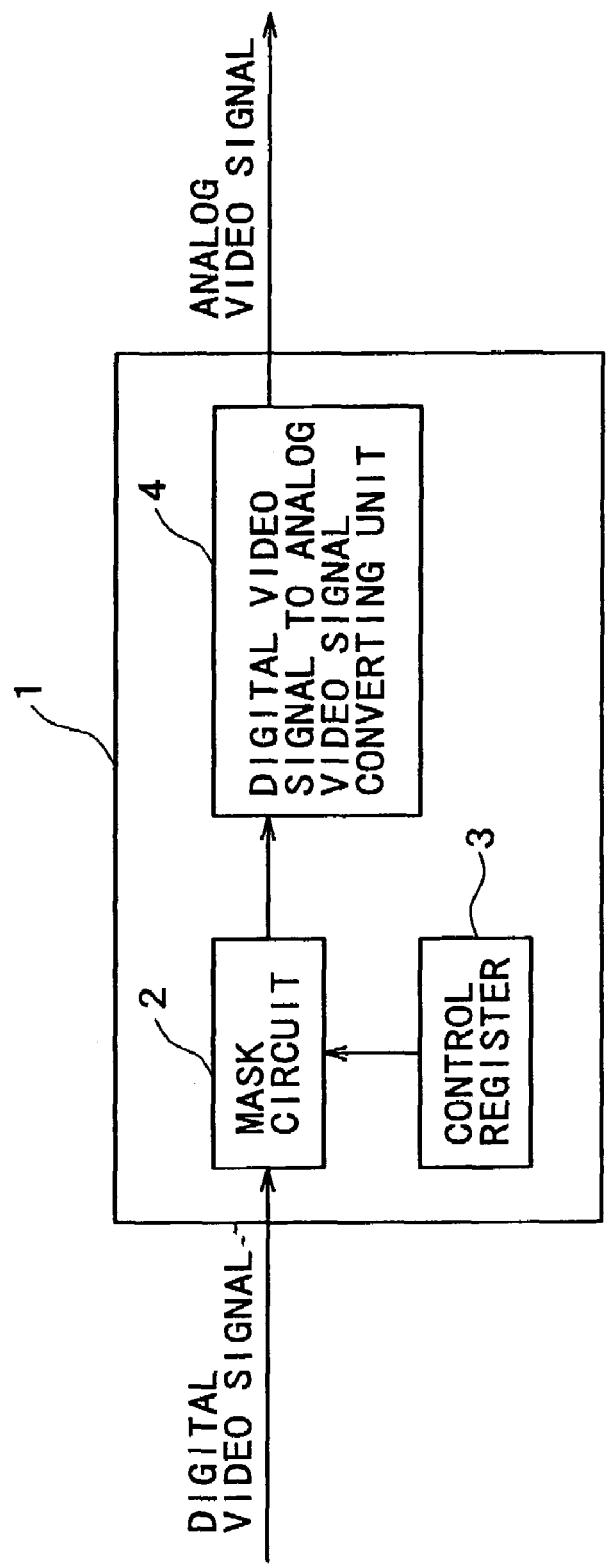
FIG. 1 is a diagram of assistance in explaining the principles of a digital video encoder according to the present invention.

FIG. 1 is a diagram of assistance in explaining the principles of a digital video encoder according to the present invention.

The digital video encoder 1 converts a digital video signal inputted thereto into an analog video signal and then outputs the analog video signal. The digital video encoder 1 includes a mask circuit 2, a control register 3, and a digital video signal to analog video signal converting unit 4.

The mask circuit 2 masks the digital video signal inputted thereto so that a video signal of the analog video signal is not outputted for a predetermined period after the output of a horizontal synchronizing signal of the analog video signal.

The control register 3 has a period of masking the digital video signal set therein and transmits the masking period to the mask circuit 2.

The digital video signal to analog video signal converting unit 4 converts the digital video signal masked for the predetermined period and outputted from the mask circuit 2 into an analog video signal and then outputs the analog video signal.

Operation of the digital video encoder of the principle diagram will be described in the following.

Figure 2:
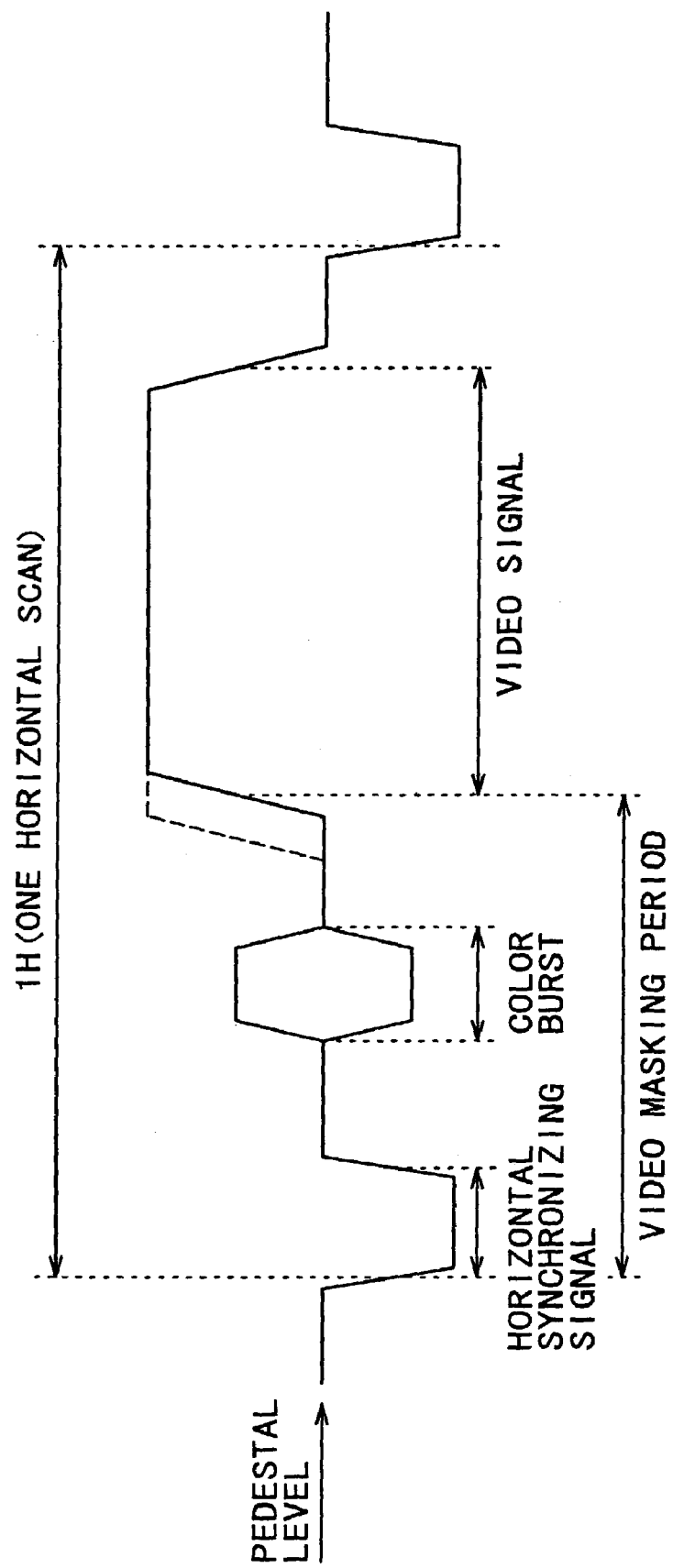
FIG. 2 is a diagram showing a waveform of an analog video signal outputted from the digital video encoder.

FIG. 2 is a diagram showing a waveform of the analog video signal outputted from the digital video encoder. The mask circuit 2 masks the digital video signal inputted thereto so that no video signal is outputted for a predetermined period after the output of a horizontal synchronizing signal of the analog video signal shown in FIG. 2. The period of masking the digital video signal is set in the control register 3, and the mask circuit 2 masks the digital video signal for the set period.

The digital video signal to analog video signal converting unit 4 converts the digital video signal masked for the predetermined period by the mask circuit 2 into an analog video signal and then outputs the analog video signal. As shown in FIG. 2, by masking the digital video signal, a part of a video signal of the digital video signal is masked, and then the digital video signal is outputted.

Thus, by setting in the control register the period of masking the digital video signal until the video signal of the analog video signal is stabilized, it is possible to output the video signal of the analog video signal stably.

Figure 3:
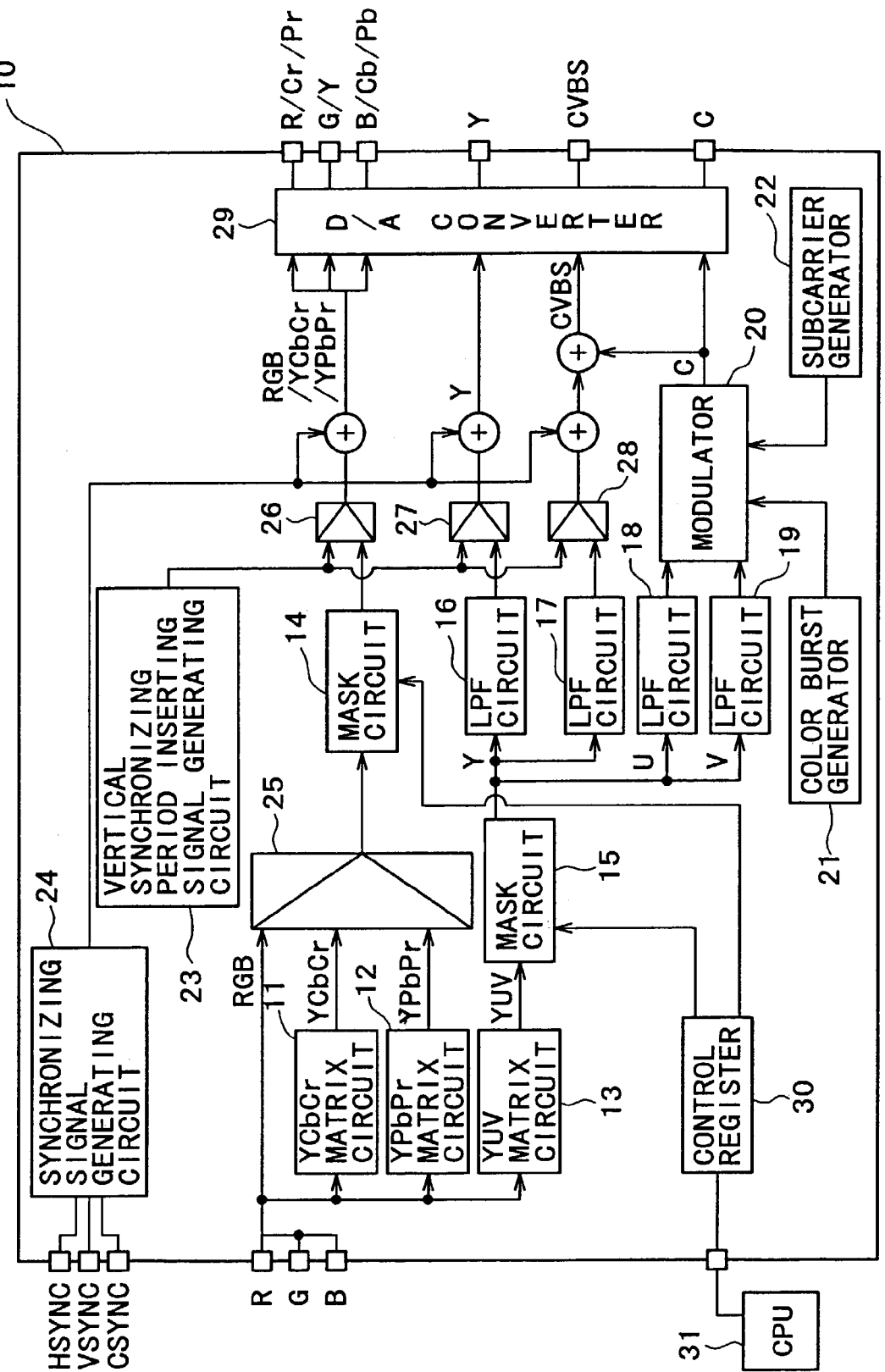
FIG. 3 is a circuit block diagram of a digital video encoder according to the present invention.

FIG. 3 is a circuit block diagram of a digital video encoder according to the present invention.

The digital video encoder 10 shown in FIG. 3 includes a YCbCr matrix circuit 11, a YPbPr matrix circuit 12, a YUV matrix circuit 13, mask circuits 14 and 15, LPF (Low-Pass Filter) circuits 16 to 19, a modulator 20, a color burst generator 21, a subcarrier generator 22, a vertical synchronizing period inserting signal generating circuit 23, a synchronizing signal generating circuit 24, switching circuits 25 to 28, a D/A converter 29, and a control register 30. The digital video encoder 10 is supplied with HSYNC (horizontal synchronizing signal), VSYNC (vertical synchronizing signal), CSYNC (composite synchronizing signal), and an RGB digital video signal and outputs an analog video signal of a RGB, YCbCr, or YPrPb component signals, Y, C, and a composite signal (CVBS) of Y and C.

The YCbCr matrix circuit 11 converts the RGB digital video signal into a YCbCr signal.

The YPbPr matrix circuit 12 converts the RGB digital video signal into a YPbPr signal.

The YUV matrix circuit 13 converts the RGB digital video signal into a YUV signal.

The mask circuit 14 masks the RGB, YCbCr, or YPbPr signals outputted from the switching circuit 25 for a predetermined period and then outputs the RGB, YCbCr, or YPbPr signals. The mask circuit 14 masks the signal for a period of a number of clocks that is eight times as much as a value set in the control register 30. Though not shown, the clocks are supplied from the outside of the digital video encoder 10, for example.

Figure 4:
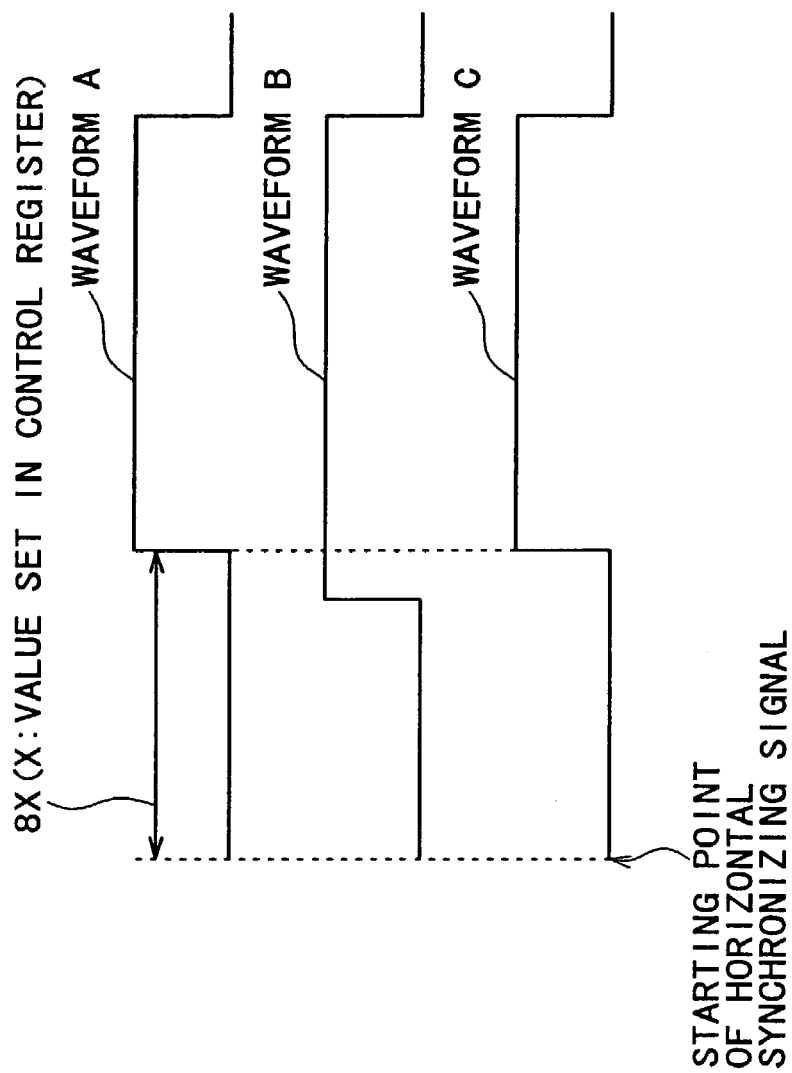
FIG. 4 is a diagram of assistance in explaining the masking of a digital video signal.
Figure 5:
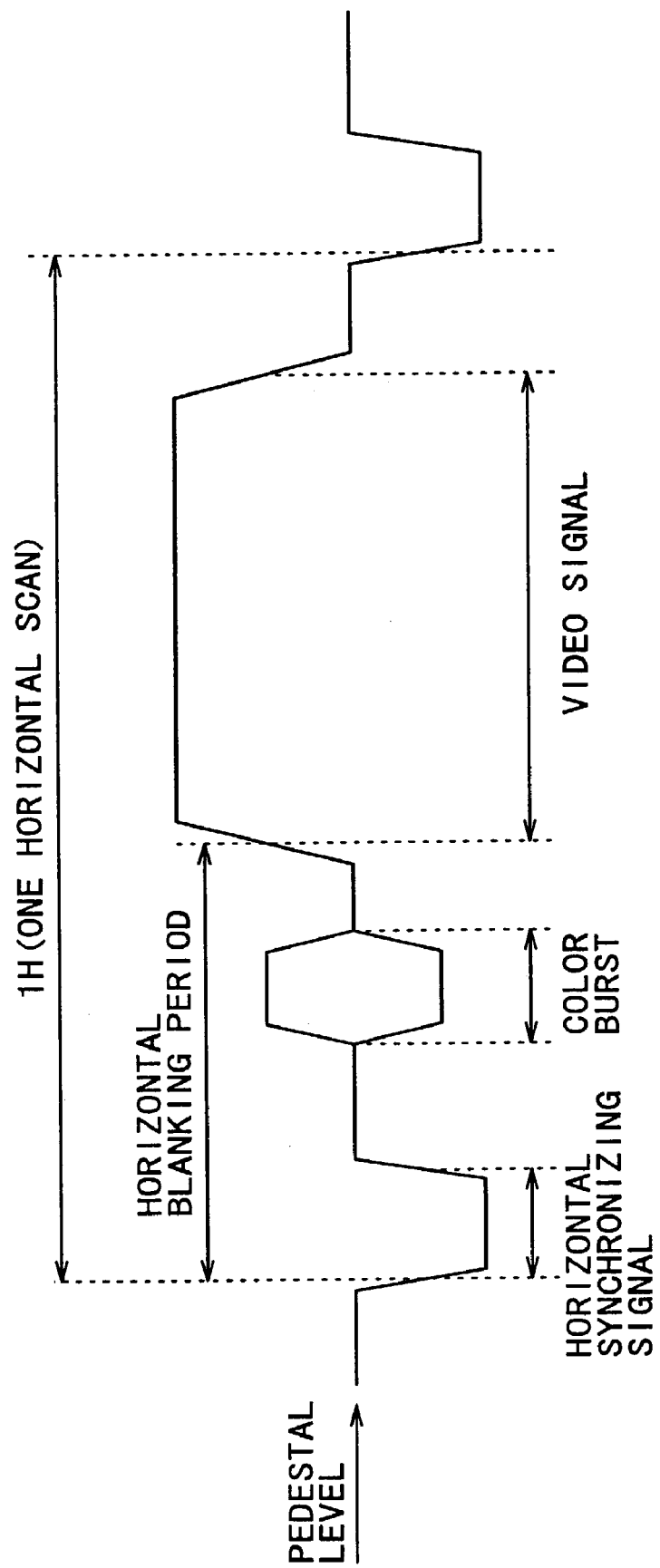
FIG. 5 is a diagram showing a waveform of an analog video signal outputted from a conventional digital video encoder.

FIG. 4 is a diagram of assistance in explaining the masking of the digital video signal. As shown in FIG. 4, the mask circuit 14 generates a mask signal (waveform A) that remains in a "L" state for a period of a number of clocks that is eight times as much as a value "X" set in the control register 30 from a starting point of a horizontal synchronizing signal and thereafter goes into an "H" state. The mask circuit 14 obtains a logical product of the mask signal and the signal (waveform B) outputted from the switching circuit 25. Thereby, the signal outputted from the switching circuit 25 is masked for the predetermined period (waveform C).

As with the mask circuit 14, the mask circuit 15 masks the YUV signal outputted from the YUV matrix circuit 13 for a predetermined period and then outputs the YUV signal. The mask circuit 15 masks the YUV signal according to a period set in the control register 30, which period is different from that of the mask circuit 14.

The LPF circuits 16 and 17 band-limit a Y signal outputted from the mask circuit 15. The Y signal band-limited by the LPF circuit 16 is outputted to the switching circuit 27. The Y signal band-limited by the LPF circuit 17 is outputted to the switching circuit 28.

The LPF circuit 18 band-limits a U signal outputted from the mask circuit 15. The band-limited U signal is outputted to the modulator 20. The LPF circuit 19 band-limits a V signal outputted from the mask circuit 15. The band-limited V signal is outputted to the modulator 20.

The modulator 20 subjects the U and V signals outputted from the LPF circuits 18 and 19 to modulation using a color burst and a subcarrier outputted from the color burst generator 21 and the subcarrier generator 22 and then outputs a C signal.

The vertical synchronizing period inserting signal generating circuit 23 generates an inserting signal of text information and screen size, which signal is inserted in a vertical synchronizing period of the analog video signal. The synchronizing signal generating circuit 24 generates a synchronizing signal that is added to the signals outputted from the switching circuits 26 to 28.

The switching circuits 25 to 28 select and output a plurality of input signals. The selection is controlled by a CPU 31, though the wiring is not shown in FIG. 3.

The D/A converter 29 outputs the RGB, YCbCr, or YPbPr signals outputted from the switching circuit 26 as a component analog video signal. The D/A converter 29 also outputs, as analog video signals, the Y signal outputted from the switching circuit 27, the C signal outputted from the modulator 20, and the CVBS signal, or the composite signal of the Y signal outputted from the switching circuit 28 and the C signal outputted from the modulator 20.

The periods of masking the digital video signal by the mask circuits 14 and 15 are set in the control register 30. The masking periods of the mask circuits 14 and 15 are set separately from each other. The control register 30 is connected to the CPU 31 by an I2C bus, for example, whereby the CPU 31 sets the masking periods.

The operation of the digital video encoder 10 will be described in the following.

The RGB digital video signal is converted into the YCbCr, YPbPr, and YUV signals by the YCbCr matrix circuit 11, the YPbPr matrix circuit 12, and the YUV matrix circuit 13. The switching circuit 25 outputs one of the RGB, YCbCr, and YPrPb signals under control of the CPU 31.

The mask circuit 14 masks the signal outputted from the switching circuit 25 for the period set in the control register 30 and then outputs the signal. The switching circuit 26 selects and outputs the signal outputted from the mask circuit 14 and the inserting signal outputted from the vertical synchronizing period inserting signal generating circuit 23. The switching circuit 26 is switched to output the inserting signal in timing of a vertical synchronizing period, whereby the inserting signal is added to the signal outputted from the mask circuit 14. The synchronizing signal of the synchronizing signal generating circuit 24 is further added to the signal to which the inserting signal is added, and the result is outputted to the D/A converter 29.

The mask circuit 15 masks the YUV signal converted by the YUV matrix circuit 13 for the predetermined period. The mask circuit 15 masks the YUV signal for the period set in the control register 30.

The Y, U, and V signals of the YUV signal outputted from the mask circuit 15 are band-limited by the LPF circuits 16 to 19. The Y signal band-limited by the LPF circuit 16 is outputted to the switching circuit 27. The Y signal band-limited by the LPF circuit 17 is outputted to the switching circuit 28.

The switching circuit 27 selects and outputs the signal outputted from the LPF circuit 16 and the inserting signal outputted from the vertical synchronizing period inserting signal generating circuit 23. The switching circuit 27 is switched to output the inserting signal in timing of a vertical synchronizing period, whereby the inserting signal is added to the signal outputted from the LPF circuit 16. The synchronizing signal of the synchronizing signal generating circuit 24 is further added to the signal to which the inserting signal is added, and the result is outputted to the D/A converter 29.

The switching circuit 28 selects and outputs the signal outputted from the LPF circuit 17 and the inserting signal outputted from the vertical synchronizing period inserting signal generating circuit 23. The switching circuit 28 is switched to output the inserting signal in timing of a vertical synchronizing period, whereby the inserting signal is added to the signal outputted from the LPF circuit 17. The synchronizing signal of the synchronizing signal generating circuit 24 and the C signal outputted from the modulator 20 are further added to the signal to which the inserting signal is added, and the result is outputted to the D/A converter 29.

The U and V signals band-limited by the LPF circuits 18 and 19 are outputted to the modulator 20. The modulator 20 subjects the U and V signals outputted from the LPF circuits 18 and 19 to modulation using a color burst and a subcarrier outputted from the color burst generator 21 and the subcarrier generator 22 and then outputs the C signal. The C signal is outputted to the D/A converter 29.

The D/A converter 29 converts each of the signals inputted thereto into an analog video signal and then outputs the analog video signal.

Thus, by setting the value in the control register 30 so as to mask a part of the video signal that overlaps the horizontal synchronizing signal and the color burst of the analog video signal, it is possible to output a stable video signal.

Further, by setting the value in the control register 30 so as to mask the video signal until the pedestal level of the analog video signal is stably clamped, it is possible to output a stable video signal.

Further, by outputting the stable video signal, the image display apparatus displays a stable image.

As described above, according to the present invention, the mask circuit masks the digital video signal inputted thereto to prevent the video signal from being outputted for a predetermined period from the start of output of a horizontal synchronizing signal of the analog video signal, and the control register has the predetermined period set therein and transmits the set predetermined period to the mask circuit. Thus, by masking the digital video signal until the video signal is stabilized, it is possible to output a stable video signal.

What is claimed is:

1. A digital video encoder for converting a digital video signal into an analog video signal and outputting the analog video signal, comprising:
   a mask circuit for masking the digital video signal inputted thereto to prevent the video signal from being outputted for a predetermined period from a start of output of a horizontal synchronizing signal of the analog video signal; and
   a control register having said predetermined period set therein for transmitting the set predetermined period to said mask circuit,
   wherein said mask circuit masks said digital video signal converted to a first luminance signal and a second luminance signal.

2. A digital video encoder as claimed in claim 1, wherein periods of masking said first luminance signal and said second luminance signal are separately set in said control register, and said mask circuit masks said first luminance signal and said second luminance signal according to said periods set in correspondence with said first luminance signal and said second luminance signal respectively.

* * * * *